(12) United States Patent
Arora et al.

(10) Patent No.: US 10,613,607 B2
(45) Date of Patent: Apr. 7, 2020

(54) SIGNAL POWERED ENERGY DETECT AND WAKEUP SYSTEM

(71) Applicant: TEXAS INSTRUMENTS INCORPORATED, Dallas, TX (US)

(72) Inventors: Anurag Arora, Bengaluru (IN); Vikram Sharma, Bengaluru (IN); Sumantra Seth, Bengaluru (IN)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 198 days.

(21) Appl. No.: 15/838,593

(22) Filed: Dec. 12, 2017

(65) Prior Publication Data
US 2019/0179398 A1 Jun. 13, 2019

(51) Int. Cl.
*G06F 1/32* (2019.01)
*G06F 1/3209* (2019.01)
*G06F 1/3234* (2019.01)
*G06F 1/3287* (2019.01)
*G06F 1/3296* (2019.01)
*G06F 1/26* (2006.01)

(52) U.S. Cl.
CPC ............ *G06F 1/3209* (2013.01); *G06F 1/26* (2013.01); *G06F 1/325* (2013.01); *G06F 1/3278* (2013.01); *G06F 1/3287* (2013.01); *G06F 1/3296* (2013.01)

(58) Field of Classification Search
CPC ........ G06F 1/3202; G06F 1/3231; G06F 1/26; G06F 1/206; G06F 1/3228; G06F 1/08; G06F 1/3289; G06F 1/266; H04L 12/12; H04L 12/10
See application file for complete search history.

(56) References Cited

U.S. PATENT DOCUMENTS

| 9,411,394 B2* | 8/2016 | Younger | G06F 1/3203 |
| 2004/0017696 A1* | 1/2004 | Allen | G11C 7/1051 |
| | | | 365/189.05 |
| 2009/0085532 A1* | 4/2009 | Liu | H02M 3/156 |
| | | | 323/222 |
| 2010/0244900 A1* | 9/2010 | Swoboda | H03K 17/22 |
| | | | 326/83 |
| 2014/0015501 A1* | 1/2014 | Youn | H03K 19/017509 |
| | | | 323/272 |
| 2016/0358566 A1* | 12/2016 | Li | G11C 19/28 |
| 2017/0068305 A1* | 3/2017 | Yu | G06F 1/3287 |
| 2018/0234089 A1* | 8/2018 | Dutta | H03K 17/162 |
| 2019/0173464 A1* | 6/2019 | Lin | H03K 17/687 |
| 2019/0179398 A1* | 6/2019 | Arora | G06F 1/3209 |

* cited by examiner

*Primary Examiner* — Zahid Choudhury
(74) *Attorney, Agent, or Firm* — John R. Pessetto; Charles A. Brill; Frank D. Cimino

(57) ABSTRACT

A wakeup circuit includes an energy detection circuit and a wakeup signal generation circuit coupled to the energy detection circuit. The energy detection circuit is configured to, in response to receiving an input signal, generate a detect signal that is proportional to the input signal. The energy detection circuit is powered by the input signal. The wakeup signal generation circuit is configured to, in response to receiving the detect signal, generate a wakeup signal.

6 Claims, 3 Drawing Sheets

SIGNAL POWERED ENERGY DETECT AND WAKEUP SYSTEM

BACKGROUND

It is advantageous for electrical systems to be power efficient. Therefore, reducing power consumption in the system is desirable. One way to reduce power consumption in an electrical circuit is to have a low power mode (e.g., a sleep mode) that a circuit may operate under while the circuit is not performing tasks. Once the circuit is needed by the system, a wakeup signal is generated to power up the circuit so that it may operate as intended. For example, in battery operated cars, it is preferable that the automotive Ethernet be power efficient to reduce energy use by the battery. Therefore, the Ethernet physical layer (PHY) can be placed in a low power sleep mode when it is not transmitting or receiving data. The Ethernet PHY is powered up once there is data toggling on the line. A detection circuit can be utilized to determine whether data is toggling on the line. Once the data is detected, a wakeup circuit can generate a wakeup signal causing the Ethernet PHY to power up (wakeup). In this way battery power is conserved.

SUMMARY

In accordance with at least one example of the disclosure, a wakeup circuit includes an energy detection circuit and a wakeup signal generation circuit coupled to the energy detection circuit. The energy detection circuit is configured to, in response to receiving an input signal, generate a detect signal that is proportional to the input signal. The energy detection circuit is powered by the input signal. The wakeup signal generation circuit is configured to, in response to receiving the detect signal, generate a wakeup signal.

Another illustrative example is an energy detection circuit that includes a multiplier and a pulldown transistor. The multiplier is configured to receive an input signal. The multiplier is also configured to, in response to receiving the input signal, generate a direct current (DC) output signal. The pulldown transistor is configured to receive the DC output signal. The pulldown transistor is also configured to, in response to receiving the DC output signal, turn on. The pulldown transistor is also configured to, in response to turning on, generate a detect signal proportional to the input signal. The input signal is configured to power the multiplier and the pulldown transistor.

Yet another illustrative example is a method for generating a wakeup signal. The method includes receiving an input signal indicating that a circuit is to exit a low power mode. The method also includes, in response to receiving the input signal, generating, by an energy detection circuit powered by the input signal, a detect signal that is proportional to the input signal. The detect signal indicates that the input signal has been received. The method also includes, in response to a determination that the detect signal has been generated, generating a wakeup signal.

BRIEF DESCRIPTION OF THE DRAWINGS

For a detailed description of various examples, reference will now be made to the accompanying drawings in which.

NOTATION AND NOMENCLATURE

Figure 1:
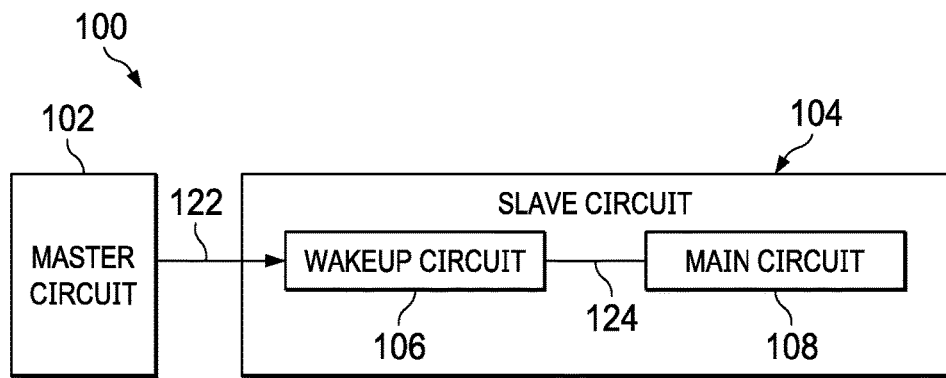
FIG. 1 shows an illustrative block diagram of a low power mode circuit system in accordance with various examples.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections. The recitation "based on" is intended to mean "based at least in part on." Therefore, if X is based on Y, X may be based on Y and any number of other factors.

DETAILED DESCRIPTION

The following discussion is directed to various examples of the disclosure. Although one or more of these examples may be preferred, the examples disclosed should not be interpreted, or otherwise used, as limiting the scope of the disclosure, including the claims. In addition, one skilled in the art will understand that the following description has broad application, and the discussion of any example is meant only to be exemplary of that example, and not intended to intimate that the scope of the disclosure, including the claims, is limited to that example.

One way to reduce power consumption in an electrical system is to have a low power mode (e.g., a sleep mode) that a circuit in the system may operate under while the circuit is not performing tasks. Once the circuit is needed by the system, a wakeup signal is generated to power up the circuit so that it may operate as intended. For example, in battery operated cars, it is preferable that the automotive Ethernet be power efficient to reduce energy use by the battery. Therefore, the Ethernet physical layer (PHY) can be placed in a low power sleep mode when it is not transmitting or receiving data. The Ethernet PHY is powered up once there is data toggling on the line. A detection circuit can be utilized to determine whether data is toggling on the line. Once the data is detected, a wakeup circuit can generate a wakeup signal causing the Ethernet PHY to power up (wakeup). In this way battery power is conserved. Thus, a signal detection circuit is responsible for detecting a signal being sent from a remote circuit (e.g., a remote PHY), reject false triggers, and wakeup the sleeping circuit (e.g., the Ethernet PHY) once a valid signal is detected.

In one conventional system, an envelope detector, comparator, and filter are utilized as a signal detection circuit. The incoming signal is received by the envelope detector which outputs an envelope of the incoming signal. The output of the envelope detector is compared with a locally generated reference voltage. The comparator output is filtered to ensure only valid signals are detected (e.g., to filter out false triggers due to noise present in the cable). This filtered signal is the signal detect output. In other words, the signal detect output indicates to a wakeup circuit that the sleeping circuit (e.g., Ethernet PHY) is to be powered up. In another conventional system, an amplifier and a filter are utilized as a signal detection circuit. The incoming signal is amplified and/or boosted by the amplifier to generate an amplified signal with a large enough amplitude to be considered as a toggling signal. The amplified signal is filtered by the filter to ensure only valid signals are detected (e.g., to filter out false triggers due to noise present in the cable). This filtered signal is the signal detect output. In other words, the signal detect output indicates to a wakeup circuit that the sleeping circuit (e.g., Ethernet PHY) is to be powered up. In both of these conventional systems, an always powered wakeup circuit (e.g., a voltage regulator and/or current source) is configured, in response to receiving the signal detect output, to generate a wakeup signal that powers the sleeping circuit.

However, conventional signal detection circuits are generally energy inefficient (e.g., power hungry). For example, conventional signal detection circuits are always powered, even while the sleeping circuit remains in the low power mode (e.g., the signal detection circuit is powered while the Ethernet PHY is sleeping). Furthermore, these techniques typically require dedicated blocks for biasing the always on wakeup circuits. This increases the low power mode power consumption as well as increases the size and complexity of the system design. Additionally, the filters in the conventional signal detection circuits require a dedicated always powered clock that includes a dedicated local oscillator. This requires additional power consumption. In short, conventional systems include signal detection circuits that consume power while the main circuit is in the low power mode. Therefore, there is a need for a signal detection circuit that can detect the presence of a signal from a remote circuit (e.g., a data signal from a remote PHY) without consuming and/or reducing power consumption while the main circuit (e.g., the Ethernet PHY) is in a low power mode.

In accordance with various examples, a low power mode circuit system is provided that includes an energy detection circuit and a wakeup signal generation circuit. The energy detection circuit receives a signal sent from a remote circuit (e.g., a remote PHY). Instead of being powered at all times by a supply as in conventional systems, the received signal itself powers the energy detection circuit. Therefore, the energy detection circuit effectively consumes no current from supply while the main circuit (e.g., the Ethernet PHY) is in the low power mode, thus, lowering the power consumption of the energy detection circuit to approximately zero during the low power mode. The energy detection circuit generates a detect signal utilizing the received signal from the remote circuit. The detect signal is configured to be received by the wakeup signal generation circuit at a switch. The switch turns on when the detect signal is received allowing a power supply to power a regulator which generates the wakeup signal to power up the main circuit. In this way, the disclosed low power mode circuit system is able to provide a wakeup signal while reducing power requirements.

FIG. 1 shows an illustrative block diagram of a low power mode circuit system 100 in accordance with various examples. The low power mode circuit system 100 includes, in an example, a master circuit 102 and a slave circuit 104. The master circuit 102 can be configured to generate and transmit input signal 122, in some examples through a wired connection, to the slave circuit 104. The input signal 122 can include data transmitted from the master circuit to the slave circuit 104. The slave circuit, in an example, is configured to have at least two modes of operation, a low power mode, in which the slave circuit 104 conserves power and an active mode in which the slave circuit 104 performs functions it is designed to perform.

For example, the master circuit 102 can be a master PHY that transmits data as input signal 122 to an Ethernet PHY acting as slave circuit 104. The Ethernet PHY can be configured to remain in a low power mode when it is not transmitting or receiving data. However, when the master PHY transmits data, as input signal 122, to the Ethernet PHY, the Ethernet PHY enters an active mode to receive the data and perform any additional functions associated with the received data (e.g., transmit Ethernet frames).

Therefore, the slave circuit 104 includes, in an example, a wakeup circuit 106 and a main circuit 108. The main circuit 108 is a circuit within the slave circuit 104 that performs the main functions of the slave circuit 104. For example, if the slave circuit 104 is an Ethernet PHY, the main circuit 108 can implement the hardware send and receive function of Ethernet frames. The main circuit 108, as discussed above, when not actively performing functions, can enter a low power mode. Therefore, the main circuit 108 is powered up (i.e., woken up) to perform functions.

The wakeup circuit is configured to receive the input signal 122 and generate a wakeup signal 124. The wakeup signal 124 is configured to cause the main circuit 108 to power up (i.e., wakeup) from a low power mode. For example, in response to receiving the input signal 122 (e.g., data transmitted by a remote PHY), the wakeup circuit 106 generates the wakeup signal 124 which is provided to the main circuit 108. The wakeup signal 124 causes the main circuit 108 to power up.

Figure 2:
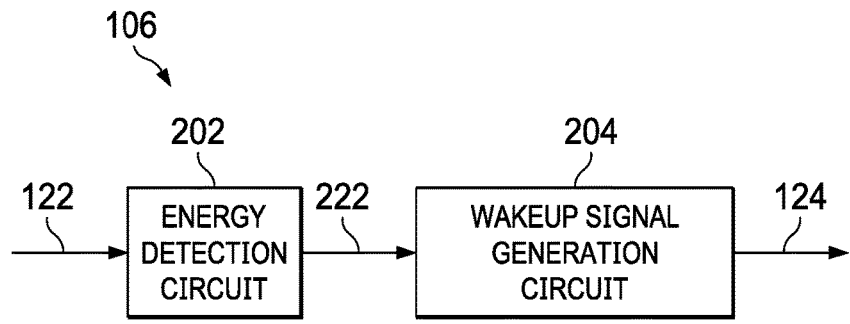
FIG. 2 shows an illustrative block diagram of a wakeup circuit in a low power mode circuit system in accordance with various examples.

FIG. 2 shows an illustrative block diagram of wakeup circuit 106 in slave circuit 104 of low power mode circuit system 100 in accordance with various examples. The wakeup circuit 106 includes, in an example, an energy detection circuit 202 and a wakeup signal generation circuit 204. The energy detection circuit 202 is configured to receive the input signal 122. In response to receiving the input signal 122, the energy detection circuit 202 is configured to generate a detect signal 222 that is proportional to the input signal 122. The energy detection circuit 202 is powered by the input signal 122, and in some examples, entirely powered by the input signal 122. In other words, the energy detection circuit 202 does not have, in an example, a voltage supply powering the circuit. Instead, the input signal 122 itself is utilized to generate the detect signal 222.

The detect signal 222 indicates that the input signal 122 has been received by the energy detection circuit 202. The wakeup signal generation circuit 204, which can be coupled to the energy detection circuit 202, receives, in an example, the detect signal 222. In response to receiving the detect signal 222, the wakeup signal generation circuit 204 is configured to generate the wakeup signal 124.

Figure 3:
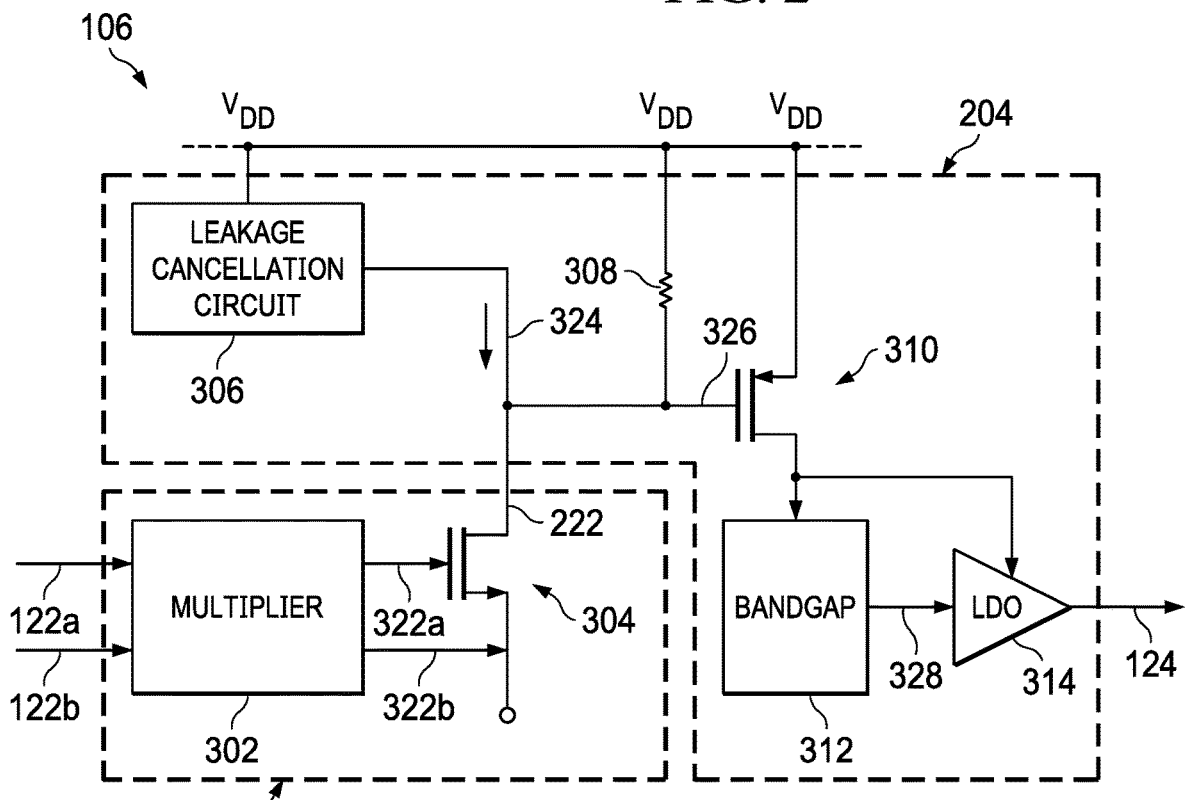
FIG. 3 shows an illustrative circuit diagram for a wakeup circuit in a low power mode circuit system in accordance with various examples.

FIG. 3 shows an illustrative circuit diagram for wakeup circuit 106 in slave circuit 104 of low power mode circuit system 100 in accordance with various examples. As discussed above, the wakeup circuit 106 includes, in an example an energy detection circuit 202 and a wakeup signal generation circuit 204. The energy detection circuit 202 includes multiplier 302 and pulldown transistor 304. The multiplier 302 is configured to receive the input signal 122 and, in response to receiving the input signal 122, generate DC output signals 322a-b. In some examples, the input signal 122 is an alternating current (AC) differential pair of signals. Thus, the multiplier 302 can receive two AC input signals 122a and 122b both of which are transmitted at the same frequency and same amplitude, but with a phase difference (e.g., 180 degrees). The multiplier 302 multiplies the input signals 122a and 122b to generate the DC output signals 322a-b (i.e., produces an output which is the product of the input signals 122a and 122b). In some examples, the DC output signals 322a-b have the same voltage value, but with opposite polarities (e.g., the DC output signal 322a is a DC positive component and the DC output signal 322b is a DC negative component). Thus, the multiplier 302 may include two multiplier components, each generating one of the DC output signals 322a and/or 322b. However, in alternative examples, the DC output signals 322a-b generated by the multiplier 302 are the same signal and/or have the same voltage and same polarity.

The pulldown transistor 304 receives the DC output signals 322a-b, and in response to receiving the DC output signals 322a-b, turns on. In other words, the DC output signal 322a, which is received, in an example, at the gate of transistor 304 and the DC output signal 322b which is received, in an example, at the source of transistor 304 generate a gate-to-source voltage that is greater than the threshold voltage of the transistor 304, thus, turning on the transistor 304. Because, in an example, the DC output signal 322a has an opposite polarity than DC output signal 322b, the gate-to-source voltage across transistor 304 has less ripples, thus, improving the performance of the transistor 304. Once the transistor 304 is turned on, the signal at the drain of transistor 304 is the detect signal 222 (e.g., a current is generated on the drain of transistor 304 when transistor 304 is turned on). While shown, in FIG. 3 as an n-channel metal-oxide-semiconductor field-effect transistor (n-channel MOSFET or NMOS), the pulldown transistor 304 can also be a p-channel MOSFET (PMOS) and/or a bipolar junction transistor (BJT). In this way, the detect signal 222 is generated without requiring any supply voltage. In other words, the input signal 122 itself provides the entire power needed by the multiplier 302 and pulldown transistor 304 to generate the detect signal 222. Therefore, while the main circuit 108 is in the low power mode and no signal is received from the master circuit 102, the energy detection circuit 202 effectively requires no power.

As discussed above, in this way, the energy detection circuit 202 is powered entirely by the input signal 122. Therefore, unlike in the conventional systems, there is no need for biasing components to generate the detect signal 222. Furthermore, the energy detection circuit 202 does not include any filtering scheme; therefore, there is no need for a local oscillator, unlike in the conventional systems. Thus, during the low power mode, the energy detection circuit 202 effectively consumes no current from the supply (not considering leakage). Hence, the energy detection circuit 202 consumes effectively zero or approximately zero power while the slave circuit 104 is in the low power mode.

The wakeup signal generation circuit 204 includes, in an example, leakage cancellation circuit 306, resistor 308, power switch 310, bandgap reference 312, and regulator 314. The resistor 308 is connected between the gate and the source of the power switch 310. More particularly, one end of the resistor 308 is connected to the drain of the pulldown transistor 304 and the gate of power switch 310 while the second end is connected to the source of power switch 310 through a power supply, shown as supply voltage $V_{DD}$. Thus, the resistor 308, in response to receiving the detect signal 222, causes a voltage drop across the resistor 308 to generate a detect voltage 326.

The power switch 310 is configured to receive the detect voltage 326, at its gate, and, in response to receiving the detect voltage 326, turn on. In other words, the detect voltage 326 generates a gate-to-source voltage that is greater than the threshold voltage of the power switch 310, thus, turning on the transistor 310. By turning on the power switch 310 (e.g., closing the power switch 310), the supply voltage $V_{DD}$ flows through the power switch 310 to power the bandgap reference 312 and the regulator 314. In other words, the power switch 310 disconnects the supply voltage $V_{DD}$ from the bandgap reference 312 and regulator 314 until the input signal 122 is detected, as detect signal 222, by the energy detection circuit 202. Therefore, the supply voltage $V_{DD}$ is prevented from being provided to the bandgap reference 312 and the regulator 314 if no input signal 122 is received by the energy detection circuit 202 because the power switch 310 is turned off (open). Thus, while the slave circuit 104 is in the low power mode, the bandgap reference 312 and the regulator 314 effectively draw zero current. While shown, in FIG. 3 as a PMOS transistor, the power switch 310 can also be an NMOS transistor and/or a BJT.

The bandgap reference 312, in response to the power switch 310 turning on and the bandgap reference 312 receiving the supply voltage $V_{DD}$, is configured to generate a reference voltage 328. The reference voltage 328 is received by the regulator 314 which is configured to generate a regulated wakeup signal 124 to power up the main circuit 108. As shown in FIG. 3, the regulator 314 is a low-dropout (LDO) regulator. However, regulator 314 can be any type of voltage regulator.

While in the low power mode, and thus, while no input signal 122 is being received by the energy detection circuit 202, the only current consumed, in some examples, from the voltage supply by the energy detection circuit 202 is in the form of leakage from the pulldown transistor 304. To eliminate a false trigger in the detect signal 222 which could cause the power switch 310 to turn on in the absence of an input signal 122 due to any leakage in the pulldown transistor 304, leakage cancellation circuit 306 is, in an example, configured to generate a leakage cancellation current 324 which is proportional to the leakage current generated by the pulldown transistor 304. In other words, the leakage cancellation circuit 306 is essentially a current mirror of the leakage current generated by the pulldown transistor 304. When the leakage cancellation current 324 is added to the leakage current generated by the pulldown transistor 304, the resistor 308 and gate of power switch 310 sees approximately zero current, thus, preventing a false trigger. The leakage cancellation circuit 306 may not be necessary in low leakage CMOS process technologies.

Figure 4A:
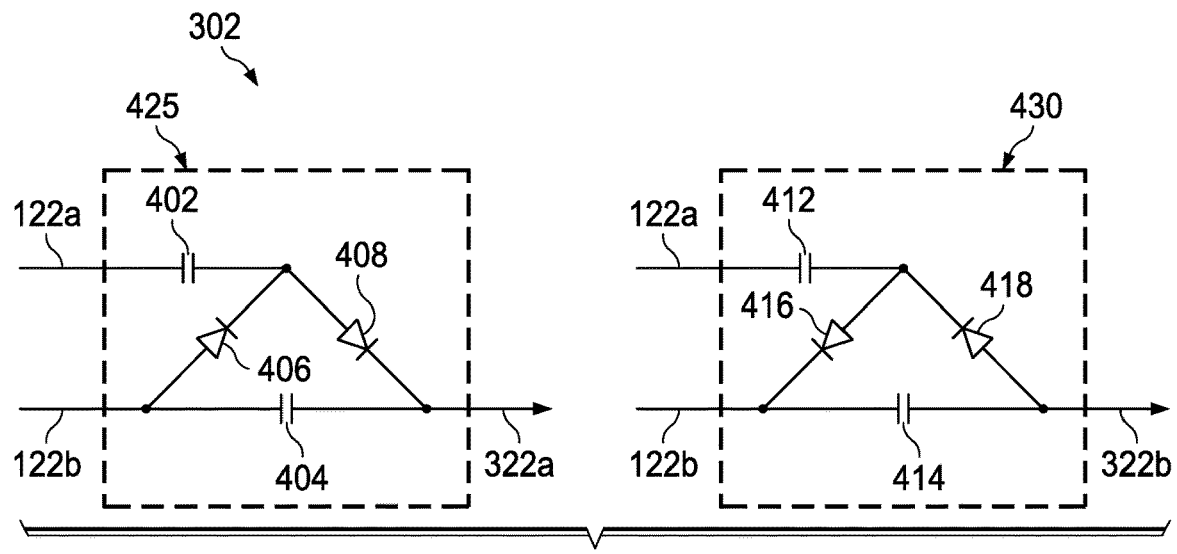
FIG. 4A shows an illustrative circuit diagram of a multiplier in an energy detection circuit in accordance with various examples.

FIG. 4A shows an illustrative circuit diagram of multiplier 302 in energy detection circuit 202 in accordance with various examples. As discussed above, the multiplier 302 can include two multiplier components, shown as multiplier components 425 and 430, each generating one of the DC output signals 322a and/or 322b. In the example shown in FIG. 4A, multiplier component 425 is configured to generate the DC output signal 322a while multiplier component 430 is configured to generate the DC output signal 322b. The multiplier component 425, in an example, includes capacitors 402-404 and diodes 406-408 in the form of a Cockroft-Walton multiplier. The multiplier component 430, in an example, includes capacitors 412-414 and diodes 416-418 in the form of a Cockroft-Walton multiplier. The only difference between the multiplier components 425 and 430 is that the diode 406 in multiplier component 425 conducts in the opposite direction as the corresponding diode 416 in multiplier component 430 and the diode 408 in multiplier component 425 conducts in the opposite direction as the corresponding diode 418 in multiplier component 430. In this way, the multiplier components 425 and 430 generate DC output signals 322a and 322b with opposite polarities.

Figure 4B:
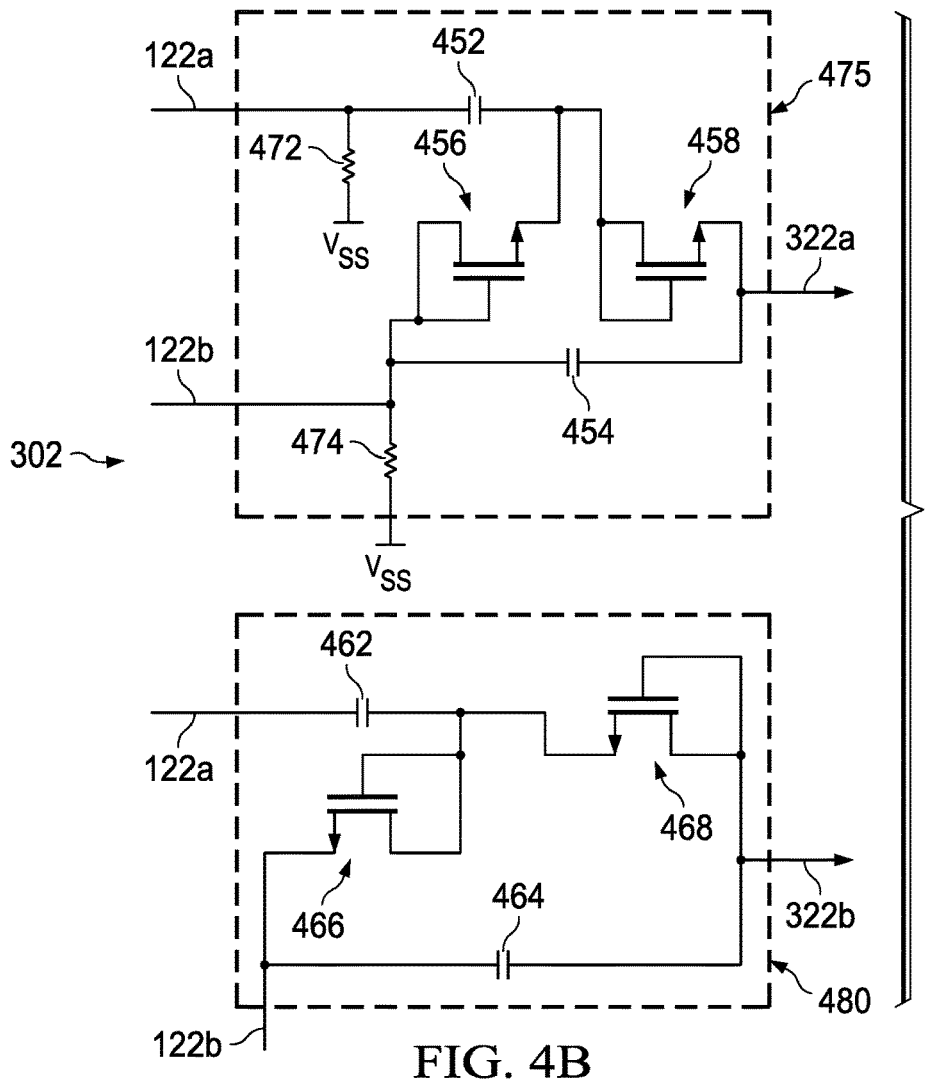
FIG. 4B shows an illustrative circuit diagram of a multiplier in an energy detection circuit in accordance with various examples.

FIG. 4B shows an illustrative circuit diagram of multiplier 302 in energy detection circuit 202 in accordance with various examples. As discussed above and like the multiplier example shown in FIG. 4A, the multiplier 302, as shown in FIG. 4B can include two multiplier components, shown as multiplier components 475 and 480, each generating one of the DC output signals 322a and/or 322b. However, unlike in FIG. 4A, the example multiplier shown in FIG. 4B utilizes transistors instead of diodes. Thus, the multiplier component 475, in an example, includes capacitors 452-454, transistors 456-458, and resistors 472-474. For multiplier component 475, the capacitor 452 receives the input signal 122a and is connected to the source of transistor 456 and the drain and gate of transistor 458. The capacitor 454 receives the input signal 122b and is connected to the gate and drain of transistor 456 and the source of transistor 458. The source of transistor 458 generates the DC output voltage 322a. For multiplier component 480, the capacitor 462 receives the input signal 122a and is connected to the drain and gate of transistor 466 and the source of transistor 468. The capacitor 464 receives the input signal 122b and is connected to the source of transistor 466 and the drain and gate of transistor 468. The drain of transistor 468 generates the DC output voltage 322b. While shown, in FIG. 4B as NMOS transistors, the transistors 456-458 and 466-468 can also be PMOS transistors and/or BJTs. In this way, multiplier components 475 and 480 generate DC output signals 322a and 322b with opposite polarities.

Figure 5:
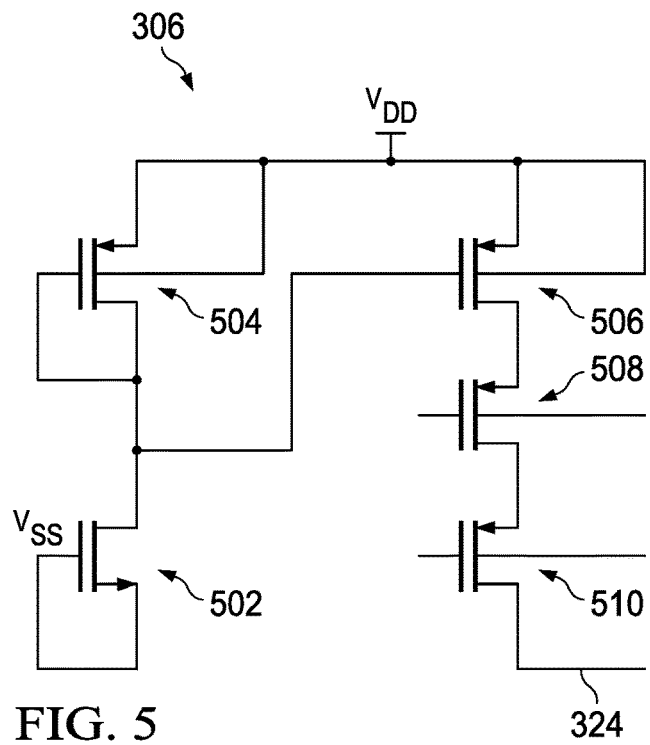
FIG. 5 shows an illustrative circuit diagram of a leakage cancellation circuit in a wakeup signal generation circuit in accordance with various examples.

FIG. 5 shows an illustrative circuit diagram of leakage cancellation circuit 306 in wakeup signal generation circuit 204 in accordance with various examples. The leakage cancellation circuit 306 includes, in an example, transistors 502-510. The gate of transistor 502 is shorted to its source. The drain of transistor 502 is connected to the drain of transistor 504. The gate of transistor 504 is shorted to its drain. The source of transistor 504 receives the supply voltage $V_{DD}$. The source of transistor 506 also receives the supply voltage $V_{DD}$ and is thus, also connected to the source of transistor 504. The gate of transistor 506 is connected to the drain of transistor 504. The transistors 508 and 510 act as bias transistors with the gate of transistor 508 driven by a first bias voltage and the gate of transistor 510 driven by a second bias voltage. The source of transistor 508 is connected to the drain of transistor 506 and the drain of transistor 508 is connected to the source of transistor 510. The drain of transistor 510 generates the leakage cancellation current 324. While the transistor 502, as shown in FIG. 5, is a NMOS transistor, the transistor 502 can also be a PMOS transistor and/or a BJT transistor. Similarly, while the transistors 504-510, as shown in FIG. 5, are PMOS transistors, the transistors 504-510 can also be NMOS transistors and/or BJT transistors. In this way the leakage cancellation current 324 can be generated to cancel any leakage current generated by the pulldown transistor 304 while the slave circuit 104 is in the low power mode.

Figure 6:
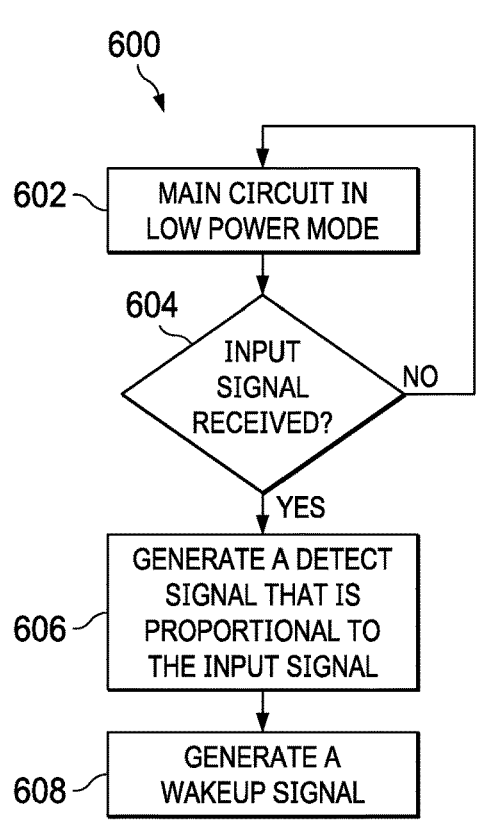
FIG. 6 shows an illustrative flow diagram of a method for generating a wakeup signal in accordance with various examples.

FIG. 6 shows an illustrative flow diagram of a method 600 for generating a wakeup signal in accordance with various examples. Though depicted sequentially as a matter of convenience, at least some of the actions shown can be performed in a different order and/or performed in parallel. Additionally, some examples may perform only some of the actions shown. In some examples, at least some of the operations of the method 600, as well as other operations described herein, are performed by the energy detection circuit 202 (including the multiplier 302 and/or the pulldown transistor 304) and/or the wakeup signal generation circuit 204 (including the leakage cancellation circuit 306, the resistor 308, the power switch 310, the bandgap reference 312, and/or the regulator 314) and implemented in logic.

The method 600 begins in block 602 with a main circuit in a low power mode. For example, in block 602 the main circuit 108 can be in a low power mode (i.e., a sleep mode). In block 604, the method 600 continues with determining whether an input signal has been received. For example, the energy detection circuit 202 is configured to receive the input signal 122 generated by the master circuit 102. More particularly, the multiplier 302 is configured to receive the input signal 122. If, in block 604, a determination is made that the input signal 122 has not been received (e.g., an input signal is received by energy detection circuit 202), then the method 600 continues in block 602 with the main circuit remaining in the low power mode.

However, if, in block 604, a determination is made that the input signal 122 has been received (e.g., an input signal is received by energy detection circuit 202), then the method 600 continues in block 606 with generating a detect signal that is proportional to the input signal. For example, as discussed above, the multiplier 302 receives the input signal 122 and generates DC output signals 322a-b. The pulldown transistor 304 receives DC output signal 322a at its gate and 322b at its source, thus generating a gate-to-source voltage that turns on the pulldown transistor 304. When the pulldown transistor 304 turns on, the current at the drain of the pulldown transistor 304 is the detect signal 222.

In block 608, the method 600 continues with generating a wakeup signal. For example, the wakeup signal generator 204 is configured to receive the detect signal 222 and, in response to receiving the detect signal 222, generate wakeup signal 124.

Figure 7:
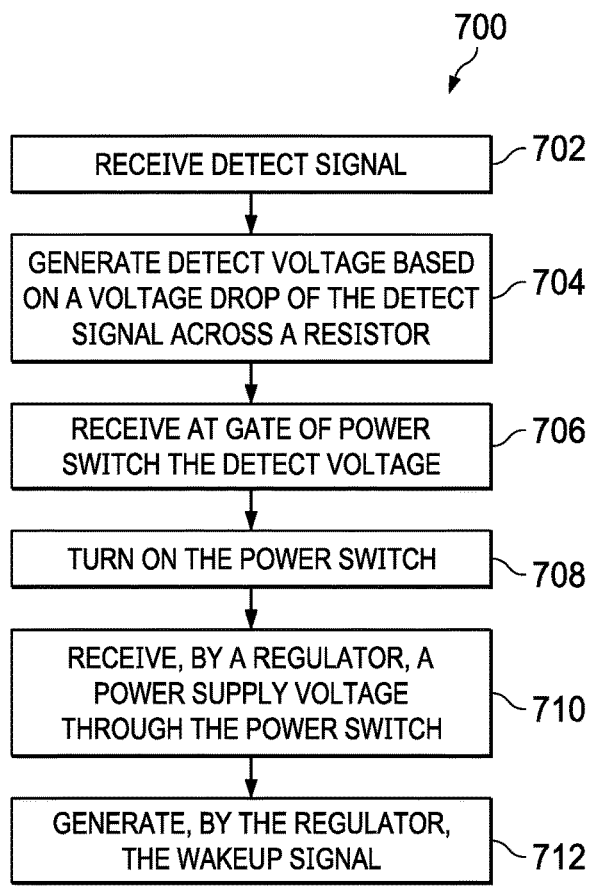
FIG. 7 shows an illustrative flow diagram of a method for generating a wakeup signal in accordance with various examples.

FIG. 7 shows an illustrative flow diagram of a method 700 for generating a wakeup signal in accordance with various examples. Though depicted sequentially as a matter of convenience, at least some of the actions shown can be performed in a different order and/or performed in parallel. Additionally, some examples may perform only some of the actions shown. In some examples, at least some of the operations of the method 700, as well as other operations described herein, are performed by the energy detection circuit 202 (including the multiplier 302 and/or the pulldown transistor 304) and/or the wakeup signal generation circuit 204 (including the leakage cancellation circuit 306, the resistor 308, the power switch 310, the bandgap reference 312, and/or the regulator 314) and implemented in logic.

The method 700 begins in block 702 with receiving a detect signal. For example, the wakeup signal generator 204 receives the detect signal 222 generated by the energy detection circuit 202. More particularly, the resistor 308 receives the detect signal 222 as a current signal. In block 704, the method 700 continues with generating a detect voltage based on a voltage drop of the detect signal across a resistor. For example, as discussed above, the resistor 308 receives the detect signal 222 as a current signal. The resistor 308 is connected between the gate of power switch 310 and the source of power switch 310. Thus, the voltage drop across resistor 308 is the detect voltage signal 326.

The method 700 continues in block 706 with receiving at the gate of the power switch the detect voltage. For example, the detect voltage signal 326 is received by the gate of power switch 310. In block 708, the method 700 continues with turning on the power switch. For example, the detect voltage signal 326 generates a gate-to-source voltage for the power switch 310 that turns on the power switch 310.

The method 700 continues in block 710 with receiving, by a regulator, a power supply voltage through the power switch. For example, in response to the power switch 310 turning on, the supply voltage $V_{DD}$ flows through the closed switch 310 to the regulator 314. In block 712, the method 700 continues with generating, by the regulator, the wakeup signal. For example, in response to receiving the supply voltage $V_{DD}$, the regulator 314 is powered. When powered, the regulator 314 generates the wakeup signal 124. More particularly, a bandgap reference 312 can generate a reference voltage that the regulator 314 utilizes to generate the wakeup signal 124. In some examples, the detect voltage signal 326 is used as the wakeup signal with a reverse polarity compared with wakeup signal 124.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. A wakeup circuit, comprising:
an energy detection circuit configured to, in response to receiving an input signal, generate a detect signal that is proportional to the input signal, the energy detection circuit powered by the input signal; and
a wakeup signal generation circuit coupled to the energy detection circuit, the wakeup signal generation circuit configured to, in response to receiving the detect signal, generate a wakeup signal;
wherein the wakeup signal generation circuit includes:
a power switch configured to, in response to the wakeup signal generation circuit receiving the detect signal, turn on;
a regulator configured to, in response to the power switch turning on, receive a power supply voltage and generate the wakeup signal;
wherein the wakeup signal generation circuit further includes a bandgap reference configured to, in response to the power switch turning on, receive the power supply voltage and generate a reference voltage, wherein the regulator is further configured to receive the reference voltage.

2. A wakeup circuit, comprising:
an energy detection circuit configured to, in response to receiving an input signal, generate a detect signal that is proportional to the input signal, the energy detection circuit powered by the input signal; and
a wakeup signal generation circuit coupled to the energy detection circuit, the wakeup signal generation circuit configured to, in response to receiving the detect signal, generate a wakeup signal;
wherein the wakeup signal generation circuit includes:
a power switch configured to, in response to the wakeup signal generation circuit receiving the detect signal, turn on;
a regulator configured to, in response to the power switch turning on, receive a power supply voltage and generate the wakeup signal;
wherein the wakeup signal generation circuit further includes a resistor connected to the energy detection circuit and a gate of the power switch, the resistor configured to receive the detect signal and cause a voltage drop across the resistor generating a detect voltage, wherein the gate of the power switch is configured to receive the detect voltage.

3. The wakeup circuit of claim 2, wherein the gate of the power switch and the resistor are connected to a drain of a pulldown transistor included in the energy detection circuit, the drain of the pulldown transistor configured to generate the detect signal.

4. An energy detection circuit, comprising:
a multiplier configured to receive an input signal and, in response to receiving the input signal, generate a direct current (DC) output signal; and
a pulldown transistor configured to receive the DC output signal, turn on in response to receiving the DC output signal, and generate, in response to turning on, a detect signal proportional to the input signal;
wherein the input signal is configured to power the multiplier and the pulldown transistor;
wherein the multiplier is configured to generate a DC output signal that includes a DC positive component and a DC negative component;
wherein the input signal is a differential pair of alternating current (AC) signals including an AC positive component and an AC negative component;
wherein the multiplier includes:
a first multiplier component configured to generate the DC positive component, the first multiplier component including:
a first capacitor configured to receive the AC positive component;
a second capacitor configured to receive the AC negative component;
a first transistor including a first source, a first drain, and a first gate, the first source connected to the first capacitor and the first drain and first gate connected to the second capacitor; and
a second transistor including a second source, a second drain, and a second gate, the second drain and second gate connected to the first capacitor and the first source and the second source connected to the second capacitor;
a second multiplier component configured to generate the DC negative component, the second multiplier component including:
a third capacitor configured to receive the AC positive component;
a fourth capacitor configured to receive the AC negative component;
a third transistor including a third source, a third drain, and a third gate, the third drain and third gate connected to the third capacitor and the third source connected to the fourth capacitor; and
a fourth transistor including a fourth source, a fourth drain, and a fourth gate, the fourth source connected to the third capacitor and the third gate and third drain and the fourth drain connected to the fourth capacitor.

5. A method for generating a wakeup signal, comprising:

receiving an input signal indicating that a circuit is to exit a low power mode;

in response to receiving the input signal, generating, by an energy detection circuit powered by the input signal, a detect signal that is proportional to the input signal, the detect signal indicating that the input signal has been received; and in response to a determination that the detect signal has been generated, generating a wakeup signal;

wherein the generating the wakeup signal includes:

generating a detect voltage based on a voltage drop of the detect signal across a resistor;

receiving at a gate of a power switch the detect voltage;

in response to receiving the detect voltage at the gate of the power switch, turning on the power switch;

in response turning on the power switch, receiving, by a regulator, a power supply voltage through the power switch; and generating, by the regulator, the wakeup signal.

6. The method of claim 5, wherein the energy detection circuit is powered entirely by the input signal.

* * * * *